United States Patent
Horowitz et al.

(10) Patent No.: US 12,280,999 B2
(45) Date of Patent: Apr. 22, 2025

(54) CUSTOMIZABLE BEVERAGES

(71) Applicant: Wild Flower Holdings Inc., New York, NY (US)

(72) Inventors: Kari Horowitz, New York, NY (US); Neal Pomroy, Cos Cob, CT (US); David Wildenstein, Wellington, FL (US)

(73) Assignee: Wild Flower Holdings Inc., New York, NY (US)

( * ) Notice: Subject to any disclaimer, the term of this patent is extended or adjusted under 35 U.S.C. 154(b) by 370 days.

(21) Appl. No.: 17/683,181

(22) Filed: Feb. 28, 2022

(65) Prior Publication Data

US 2023/0264939 A1    Aug. 24, 2023

Related U.S. Application Data (63) Continuation-in-part of application No. 17/678,956, filed on Feb. 23, 2022.

(51) Int. Cl.
| | | |
|---|---|---|
| B67D 1/00 | (2006.01) | |
| B67D 1/08 | (2006.01) | |
| G05B 15/02 | (2006.01) | |

(52) U.S. Cl.
CPC ......... *B67D 1/0034* (2013.01); *B67D 1/0888* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 10,206,888 B2 | 2/2019 | Vu et al. | |
| 10,897,925 B2 | 1/2021 | Pandolfino | |
| 2009/0008407 A1* | 1/2009 | Sevcik | B67D 1/0858 222/394 |
| 2009/0069932 A1* | 3/2009 | Rudick | B67D 1/0021 700/239 |
| 2015/0251891 A1* | 9/2015 | Peters | G07F 13/065 222/129.1 |
| 2016/0368753 A1* | 12/2016 | Bethuy | A47J 31/4403 |
| 2020/0202409 A1* | 6/2020 | Jikomes | G06Q 30/0607 |
| 2021/0307378 A1 | 10/2021 | Rabie | |
| 2021/0397758 A1* | 12/2021 | Haeni | G06Q 30/0643 |

OTHER PUBLICATIONS

U.S. Appl. No. 17/678,956, Restriction Requirement mailed Sep. 5, 2024, 6 pages.
U.S. Appl. No. 17/678,956, Non-Final Office Action mailed Dec. 17, 2024, 15 pages.

* cited by examiner

*Primary Examiner* — David Earl Ogg
(74) *Attorney, Agent, or Firm* — Conley Rose, P.C.

(57) ABSTRACT

Techniques for performing on-demand customization of beverages to improve the drinking experience may include receiving a target flavor, comparing the target flavor with a base flavor that is associated with a beverage, and receiving a chemical signature that can be used as a reference for injecting predetermined dosages of one or more formulations into a dispenser line of the beverage dispenser. A mixing of the associated beverage and the formulations may generate a combination that corresponds to or is associated with the target flavor. This technique of on-demand customization of the beverages may improve the drinking experience and reduce the cost of drinking by dynamically adjusting the amount of chemicals to be added to the base flavor depending on a target experience or flavor.

20 Claims, 5 Drawing Sheets

| Keg Labels 410 | Base Flavor 420 | Liqueur Flavors 430 | Chemical Signatures 440 |
|---|---|---|---|
| First Label 412 | Gin Flavor 422 | Medium Strength Gin 432 | 70% TCH Formulations 442 |
| | | High Strength Gin 434 | 70% TCH Printed Dissolvable Substrate 444 |
| Second Label 414 | Rum Flavor 424 | Medium Strength Selection Rum 436 | 70% TCH Formulations 446 |
| | | High Strength Rum 438 | 70% TCH Printed Dissolvable Substrate 448 |

LUT 400

CUSTOMIZABLE BEVERAGES

CROSS-REFERENCE TO RELATED APPLICATION

This application is a continuation-in-part of U.S. patent application Ser. No. 17/678,956 filed on Feb. 23, 2022, entitled "Customizable Printable Solutions for Delivery of Inhalants," which is hereby incorporated by reference in its entirety.

BACKGROUND

Distilled beverages that are sold commercially may be produced from plant materials. After a distillation process, each product may include distinct aromas and flavors, which can reflect raw materials that were used, method of distillation process performed, and/or post-distillation treatments made on the product. Flavor compounds in distilled beverages may be referred to as congeners. Different distilled beverages may have small differences in congener levels but have large differences in flavor and aroma intensities.

Presently, some are experimenting with different enhancements of distilled beverages, examples of which include aggregating raw materials of tobacco, alcohol, and similar products and then mechanically mixing the aggregated raw materials into the distilled beverages. These types of distilled beverages may be combined to come up with different flavors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes techniques for performing an on-demand customization of beverages to improve the drinking experience. In some embodiments, the beverage is a distilled beverage, although concepts described herein may be applicable to other beverages. For example, the techniques may include receiving a target flavor (e.g., from a selection of a target flavors received via a user interface) of a beverage dispenser, comparing chemical components of the target flavor with a base flavor, and receiving a chemical signature based at least in part upon a comparison between the target flavor and the base flavor. In some examples, the distilled beverage may include at least a liqueur. The chemical signature may be received by the beverage dispenser from a server. In some examples, the base flavor may be associated with distilled beverages that include, without limitation, gin, tequila, vodka, whiskey, or rum. The target flavor may include a combination of the beverages and additional chemicals such as, without limitation, predetermined dosages of *cannabis*, terpenes, or a suitable combination thereof. In one example, the beverage dispenser may utilize the chemical signature as a reference for injecting one or more formulations into a dispenser line that supplies the beverages from their corresponding kegs (or other container) to a beverage dispenser tower (or faucet). In this example, a mixture of the beverages and the formulations in the dispenser line may generate a combination that creates the selected or targeted flavor. This technique of on-demand customization of the beverages may improve the drinking experience and reduce the cost of drinking flavors by dynamically adjusting the amount of chemicals to be added to the base flavor as needed for an enhanced drinking experience.

Without limitation, the chemical signature may include information that identifies dosages, types, and/or other data associated with the formulations to be used for generating/creating the flavor or flavor change. The information may further identify a method or timing of injecting the formulations to the dispenser line. In one embodiment, the chemical signature can be based upon a comparison between chemical components of the base flavor and the selected flavor. For example, the comparison may result in adding a dosage of cannabidiol or a terpene to the distilled beverages. Here, the selected flavor may include additional dosages of cannabidiol, terpene, and/or tobacco.

As described herein, *cannabis* is a genus of flowering plants that include the species: *Cannabis sativa*, *Cannabis indica*, and *Cannabis ruderalis*. *Cannabis* has long been used for hemp fibers, seed and seed oils, medicinal purposes, and recreational purposes. Cannabidiol, better known as "CBD," is one of the chemical compounds called "cannabinoids" that are found in the *Cannabis sativa* plant. The *Cannabis sativa* plant may also include terpenes, which are common compounds in the natural world. Terpenes are responsible for the smell of most plants. The terpenes may act on the endocannabinoid system in the human body in a similar way to the cannabinoids.

Details regarding the novel products and techniques referenced above and presented herein are described in detail, below, with respect to several figures that identify elements and operations used in systems, devices, methods, and computer-readable storage media that implement the techniques. Some embodiments are described of generating flavors for liqueurs or liqueur flavors. However, similar concepts may be applied to other beverages, distillates, and/or flavors, which are considered to be within the spirit and scope of the disclosure. Therefore, where the description refers to "flavors for liqueurs" or "liqueur flavors," the corresponding embodiments should be considered examples and not limited to liqueurs unless the context dictates otherwise.

Example Contextual Diagram

Figure 1:
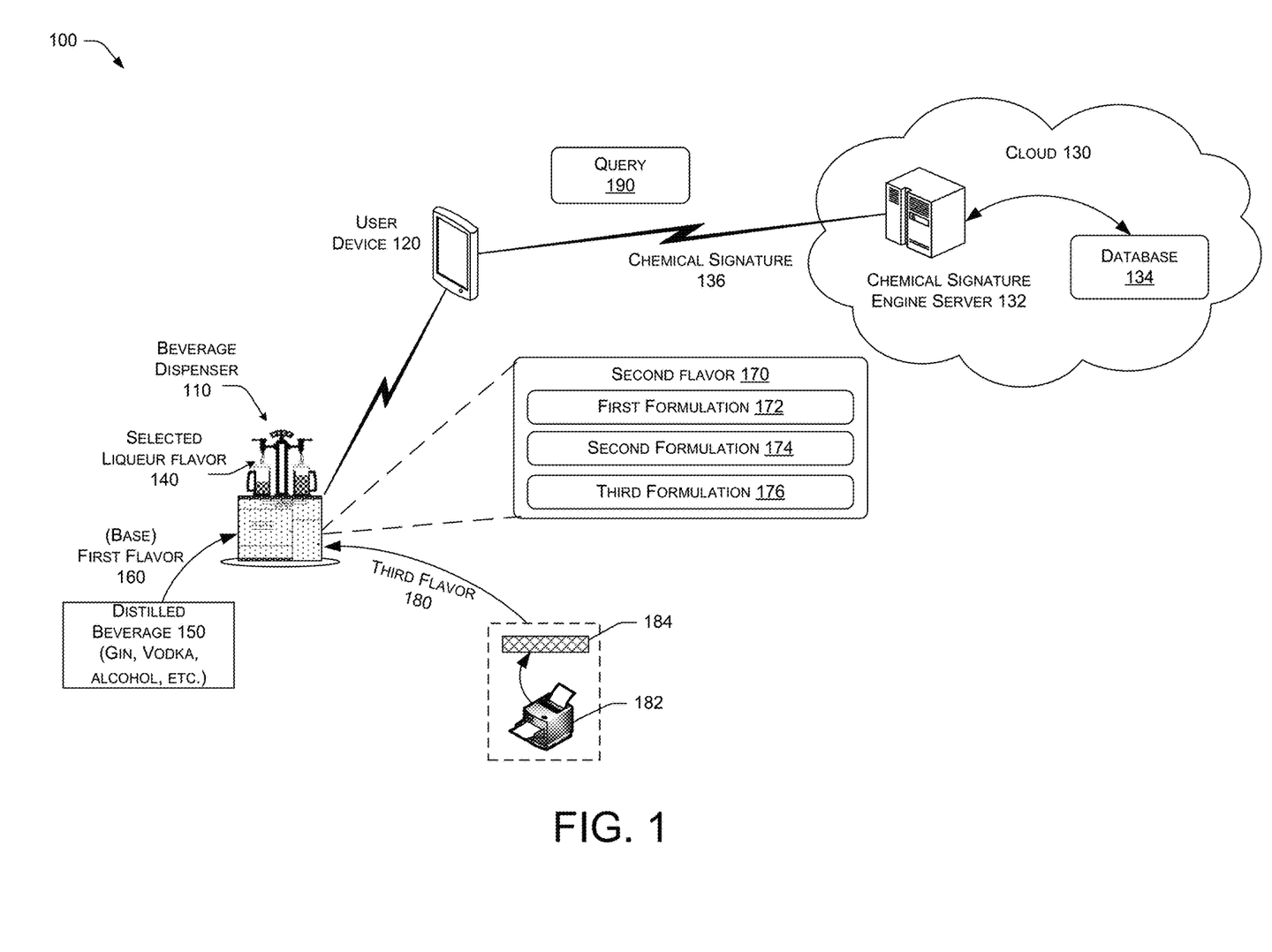
FIG. 1 is a context diagram for an example of implementing an on-demand customization of distilled beverages to generate a desired flavor, in accordance with at least one embodiment.

FIG. 1 is a context diagram 100 that illustrates an example of an on-demand customization of distilled beverages to generate, e.g., liqueur flavors to improve the alcohol drinking experience. As shown, a beverage dispenser 110 may be associated with a user device 120, which may be communicatively connected to a chemical signature engine server 132, existing for example in a cloud network 130. The chemical signature engine server 132 may be connected to a database 134 that stores a plurality of chemical signatures. Each chemical signature in the stored chemical signatures may be comprised of a set of identifiers for various chemicals, corresponding quantities, and other data. The chemical signature engine server 132 may include one or more servers that can be configured to generate a chemical signature 136, which can be used by the beverage dispenser 110 as a reference to generate/create a targeted or selected liqueur flavor 140.

Context diagram 100 further illustrates distilled beverages 150 that can be associated with a first flavor 160 (sometimes referred to herein as a base flavor), which may be combined with a second flavor 170 and/or a third flavor 180 to generate the selected liqueur flavor 140 (sometimes referred to herein as a targeted liqueur flavor). The second flavor 170, which may be generated via a combination of one or more formulations, or the third flavor 180, which may be generated via a printed dissolvable substrate, may each contain certain dosages of *cannabis*, terpenes, or a suitable combination thereof. The selected liqueur flavor 140 may be dynamically varied or generated on demand based upon the liqueur flavor that can be selected via a user interface of the beverage dispenser. This technique of customizing on demand the liqueur flavor may improve the user experience and can in some instances be a cheaper way to dynamically add *cannabis*, terpenes, etc. to distilled beverages.

As shown, the first flavor 160 may be associated with a beverage. In some examples described herein, the beverage may be a distilled beverage such as, without limitation, gin, tequila, vodka, whiskey, brandy, or rum. Distilled beverages may be produced from a wide variety of plant materials such as grains, fruits, seeds, stems, or leaves. The flavors of these distilled beverages may be based upon different types of raw materials, variations in processing of raw materials, fermentation, distillation, maturation, and blending processes, to name several. For example, gin is a distilled alcoholic drink that may be derived from juniper compounds, coriander compounds, citrus peel compounds, and mixed with a certain volume of ethanol. Rum is a distilled drink that may be derived from fermented sugarcane or molasses, and so on. In one embodiment, each of the distilled beverages may be separately pumped via a dispenser line (not shown) that connects a keg of the distilled beverage to a beverage dispenser tap or faucet. For example, the gin may be pumped from the beverage dispenser via a first dispenser line (not shown), the vodka can be supplied via a second dispenser line (not shown), and so on. In this embodiment, and during the pumping of the corresponding distilled beverage, the second flavor 170 or the third flavor 180 may be injected into the dispenser line and mixed with the distilled beverage.

The second flavor 170 may be associated with a combination of one or more formulations such as a first formulation 172, a second formulation 174, and a third formulation 176. Each of these formulations may include one or more different types of chemical components and can be drawn from their corresponding reservoir (not shown) within the beverage dispenser 110. The one or more formulations may be pumped or injected into the dispenser line to combine with the distilled beverage associated with the first flavor 160. The first formulation 172, second formulation 174, and third formulation 176 are for illustration purposes only and additional or other formulations may form the second flavor 170 without affecting the embodiments described herein.

The third flavor 180 may be associated with a printed dissolvable substrate that can be inserted and/or dissolved into the dispenser line to mix/combine with the distilled beverages. For example, a printer 182 may print one or more layers of ink on a dissolvable substrate 184 to generate the printed dissolvable substrate that is associated with the third flavor 180. In one embodiment, the ink may include a composition that can be obtained via a combination of the formulations that are associated with the second flavor 170.

In one embodiment, the second flavor 170 and/or the third flavor 180 may be generated using the chemical signature 136 as a reference, which can be received by the user device 120 in response to sending a query 190 requesting the chemical signature engine server 132 for the selected liqueur flavor. In response to the request, the chemical signature engine server 132 may perform a comparison to determine a difference, for example, between the first flavor 160 and the selected liqueur flavor 140. Based on the comparison, the second flavor 170 and/or the third flavor 180 may be combined with the first flavor 160 to obtain the selected liqueur flavor 140.

The beverage dispenser 110 may include one or more kegs of gins, vodkas, rums, whiskeys, etc. Each of the kegs may be connected to a CO2 tank (not shown) that can supply air to the kegs and pump the distilled beverages from the keg upon opening the beverage dispenser tap or faucet. Each of the kegs may include a dispenser line that connects to the beverage dispenser tap or faucet. In one embodiment, the flavor that is associated with the distilled beverage is represented by the first flavor 160.

The targeted or selected liqueur flavor 140 may include an enhanced distilled beverages flavor that can be generated on demand via the user device 120 or through the beverage dispenser itself. The targeted liqueur flavor may include an enhancement of the base flavor via, without limitation, adding a certain dosage of tetrahydrocannabinol, cannabidiol, terpenes, or a suitable combination thereof, to the beverage. In one embodiment, the beverage dispenser 110 may be configured to present options for the target liqueur flavors to a user. For example, on the beverage dispenser, each liqueur flavor may correspond to a preset radial position of a liqueur flavor wheel (not shown) that can be rotated to select the liqueur flavor from different liqueur flavors offered by the beverage dispenser 110. The liqueur flavor wheel may include an indicator tab that stops at a predetermined number of preset radial positions where each present radial position corresponds to a liqueur flavor that can be presented via a user interface. In this example, the selected liqueur flavor may include the combination of the base flavor that can be derived from the distilled beverage 150 and the additional flavor that can be obtained from the one or more formulations or the printed dissolvable substrate.

In one embodiment, the selected liqueur flavor 140 may include subtraction or addition of dosages of the second flavor 170 and/or the third flavor 180 in the dispensing line of the beverage dispenser. In this embodiment, the beverage dispenser may cause the injection of the formulations and/or insertion of the printed dissolvable substrate into the dispensing line.

Without limitation, the second flavor 170 may be generated to add a particular amount or dosage of tetrahydrocannabinol, cannabidiol, terpenes, or a suitable combination thereof to the first/base flavor. The second flavor 170 may be generated from one or more formulations that include a liquid, solid, or gel formulation including, but not limited to, one or more of water, solvents, glycerin, polyvinylpyrrolidone, ethanol, plant extracts, and the like. The formulation may further include active ingredients such as tetrahydrocannabinol, terpenes, etc. Other ingredients or chemicals may include flavorings such as mint and menthol. Still, other chemicals may include fixative agents or preservatives.

The third flavor 180 may be associated with the printed dissolvable substrate that can be inserted in increments, for example, into a dispenser line of the beverage dispenser 110. The third flavor 180 may be used as an alternative to the second flavor 170 that is associated with the one or more formulations. In some cases, the second flavor 170 and the third flavor 180 may be combined to increase the amount of dosages of cannabidiol, terpene, etc. in the dispensing line. Here, the printer 182 may receive the chemical signature 136 from the beverage dispenser 110, user device 120, or directly from the chemical signature engine server 132. The printer 182 may receive the chemical signature from the beverage dispenser when the beverage dispenser itself is performing the on-demand customization process such as sending of the query to the chemical signature engine server, receiving the chemical signature, and the like. Based upon the chemical signature 136, the printer 182 may print at least a single layer in a continuous pattern over a printable area of the dissolvable substrate 184 to produce the printed dissolvable substrate. The single layer may include a particular dosage, amount, or chemical characteristics that comply with the received chemical signature 136.

For example, the selected liqueur flavor may require an additional compound that comprises 70% purified cannabinoid by weight for each dose that is combined with gin as the base flavor. Here, the chemical signature may include specific quantities and types of the chemical compounds that can be mixed to generate the desired additional compound comprising of 70% purified cannabinoid by weight for each dose that is combined with the gin. In this example, and to prepare the ink for the printer 182 based on this chemical signature, a purified cannabinoid from molecules such as tetrahydrocannabinol (THC) may be combined with a purified terpene, glycerin, ethanol, polyvinylpyrrolidone, and water to create a composition of ink comprised substantially of THC by weight. Without limitation, 70 mL of THC, 3.0 mL of purified terpene such as linalool, 7 mL of glycerin, 20 mL of ethanol, 100 mg of polyvinylpyrrolidone, and 15 mL of water may be mixed thoroughly to generate the ink composition that comprises 70% purified cannabinoid by weight and 3% terpene by weight. The ink composition is then loaded and printed onto the printed dissolvable substrate, which can be mixed into the distilled beverage in the dispensing line. The mixed printed dissolvable substrate may generate the third flavor 180 that comprises 70% purified cannabinoid by weight for every 10 mg of THC for example.

Following the preceding example, the generated ink composition may be scaled and similarly implemented by one or more nozzles (not shown) that inject the formulations that are associated with the second flavor 170. For example, the formulations associated with the second flavor 170 may include 0.7 mL of THC, 0.03 mL of purified terpene such as linalool, 0.07 mL of glycerin, 0.02 mL of ethanol, 1000 mg of polyvinylpyrrolidone, and 1 mg of polyvinylpyrrolidone, and 0.150 ml of water. In this example, the corresponding nozzle for each formulation may inject the corresponding amounts into the dispenser line to add the 70% purified cannabinoid by weight and 3% terpene by weight to each 10 mg dose of THC.

The beverage dispenser 110 may include one or more processors and other hardware, as well as software components including those executable by the processor(s), to combine the distilled (associated with the first flavor) with the formulation(s) (associated with the second flavor) or the printed dissolvable substrate (associated with the third flavor) to generate the selected liqueur flavor 140. In one embodiment, the beverage dispenser 110 may include embedded sensors (not shown) to recognize a label, stamp, engraving, or the like bearing an identifier for the keg to detect type and other data of the first flavor 160. For example, each keg may include a label that can be used to identify the gin, rum, tequila, etc. components of the base flavor that can be supplied via the dispensing line of the beverage dispenser. The label that is associated with the key may be stored in the beverage dispenser or the chemical signature engine server 132. The beverage dispenser may also include a user interface to show different selections for the desired liqueur flavors. Based upon a user-selected liqueur flavor, the beverage dispenser 110 may send this information of the first flavor and the selected liqueur flavor to the user device 120. The user device 120 may then send the query 190 to the chemical signature engine server 132.

In response to receiving the query 190 from the user device, the chemical signature engine server 132 may retrieve the chemical signature 136 from the database 134 and send the chemical signature 136 to the user device 120, which may transmit the chemical signature 136 to the beverage dispenser 110 and/or the printer 182. The chemical signature 136 may define the composition of the second flavor 170 and/or the third flavor 180 to be combined with the first flavor 160. In some embodiments, the beverage dispenser 110 may include a processor that can execute instructions to determine the chemical signature based upon the first flavor 160 and the target liqueur flavor that can be selected via the beverage dispenser user interface. For example, the processor may use a look-up table (LUT) to determine the chemical signature based upon the selected liqueur flavor and the type of base flavor in the dispensing line of the beverage dispenser. The LUT is described in detail in FIG. 4 below.

The user device 120 may be embodied by a cellular phone, a smart phone, a session initiation protocol (SIP) phone, a laptop, a personal digital assistant (PDA), a satellite radio, a global positioning system, a multimedia device, a video device, a camera, a game console, a tablet, a smart device, a wearable device, or any other similar functioning device. In one embodiment, the user device 120 may communicate with the chemical signature engine server 132 to obtain the chemical signature 136. In this embodiment, the user device may forward the chemical signature 136 to the beverage dispenser 110 and/or the printer 182. In some embodiments, the printer 182 may be integrated within the beverage dispenser 110.

The chemical signature engine server 132 and the database 134 may include hardware and software infrastructures that can be resident in the cloud 130. In some embodiments, the database 134 may be included in the chemical signature engine server 132. The chemical signature engine server 132 may process the query 190 from the user device 120 or the beverage dispenser 110 to determine the chemical components to be added or combined with the base flavor. In some cases, use of the chemical signature 136 may implement a cheaper version of the targeted liqueur flavor 140 when the raw material components in the second flavor 170 or the third flavor 180 can be bought at bulk lower prices.

Example Beverage dispenser

Figure 2:
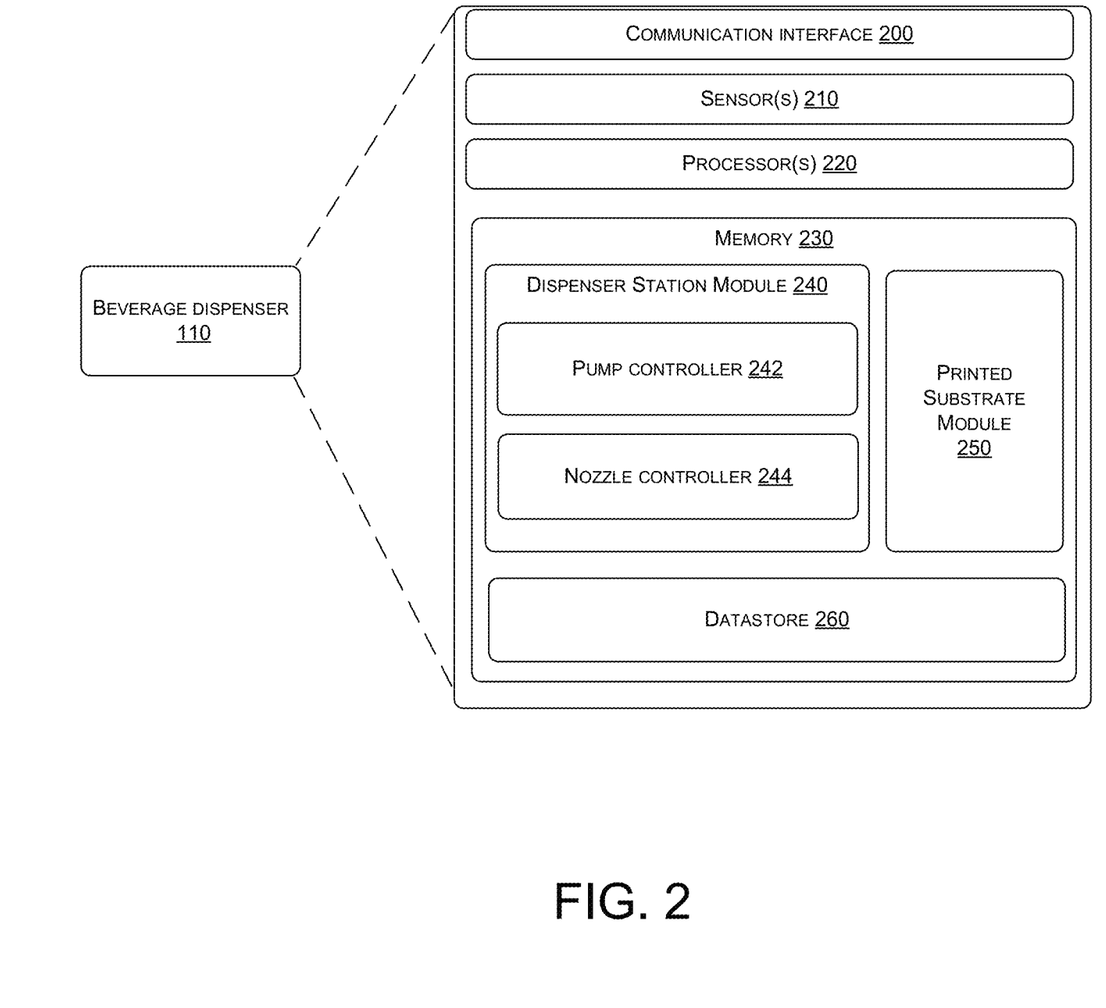
FIG. 2 is a diagram of exemplary components of a beverage dispenser, in accordance with at least one embodiment.

FIG. 2 illustrates an exemplary embodiment of a beverage dispenser apparatus that communicates with the chemical signature engine server to receive the chemical signature, which can be used as a reference to generate the selected or targeted liqueur flavor. In the illustrated example, the beverage dispenser 110 may include a communication interface 200, sensor(s) 210, one or more processors 220, and a memory 230. The memory 230 may include a dispenser station module 240 that further includes a pump controller 242 and a nozzle controller 244. The memory 230 may further include a printed substrate module 250 and a datastore 260.

In one example, the beverage dispenser 110 may communicate with the user device 120, chemical signature engine server 132, and/or the printer 182 through the communication interface 200, which can include hardware, software, or a combination of hardware and software to transmit and/or receive data. Communication interface 200 may include a transceiver that facilitates wired or wireless communications through a cellular network or a broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), etc.

Sensor(s) 210 may include, without limitation, a pressure sensor, power sensor, and/or other similar sensors that can be used during beverage dispensing. For example, the sensor(s) 210 may detect the activation of a beverage dispenser faucet via a measurement of pressure that is being released by the CO2 tank, which is connected to the keg for the particular distilled beverage to be pumped. In another example, the sensor(s) 210 may detect the quantity and type of the formulations that are available for mixture with the base flavor that is associated with the distilled beverages. In another example, the sensor(s) 210 may detect the amount of printed dissolvable substrate that can be mixed in the dispenser line, identify labels of different kegs, and so on. In these examples, the sensor(s) 210 may send sensor data to the processor(s) 220 for further processing.

Processor(s) 220 may be a central processing unit(s) (CPU), graphics processing unit(s) (GPU), both a CPU and GPU, or any other sort of processing unit(s). Each of the one or more processor(s) 220 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 220 may also be responsible for executing all computer applications stored in the memory, which can be associated with common types of volatile (RAM) and/or non-volatile (ROM) memory. For example, the processor(s) 220 may send the query to the chemical signature engine server. The processor(s) 220 may also process the chemical signature from the chemical signature engine server 132 where the chemical signature may indicate the quantities and types of formulations to be combined. In another example, the processor(s) 220 may use the communication interface 200 to send the sensor data, base flavor, selected liqueur flavor, and other beverage dispenser data to the user device, chemical signature engine server, and/or the printer. The processor(s) 220 may be coupled with the dispenser station module 240 and the printed substrate module 250.

Memory 230 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

The dispenser station module 240 and the printed substrate module 250 may include routines, program instructions, objects, and/or data structures that perform tasks or implement particular abstract data types. For example, the dispenser station module 240 may include one or more instructions, which when executed by the one or more processors, direct the beverage dispenser 110 to dispense a mixture of distilled beverages and a particular dosage of cannabidiol, terpene, etc. In one embodiment, the dispenser station module 240 may be configured to control the operations of each dispenser station in the beverage dispenser. The dispenser station may include a dispensing pump that can be operated independently from other dispensing pumps. For example, a dispensing pump for gin is different from the dispensing pump for whiskey, and so on. In one example, the dispenser station module 240 may be run to combine the base flavor that is associated with the distilled beverages with a different flavor to generate the desired liqueur flavor. Different distilled beverages may be pumped through the different dispenser stations and in this regard, the dispenser station module 240 may be executed to regulate the pumping of the liqueur flavor based upon the requested liqueur flavors. Without limitation, the base flavor may include gin, tequila, vodka, whiskey, or rum, while the injected formulations or printed dissolvable substrate may include an additional amount of purified cannabinoid, terpene, or a suitable combination thereof.

The pump controller 242 may include one or more instructions, which when executed by the one or more processors direct one or more dispenser stations to pump the base flavor, second flavor, third flavor, or a suitable combination thereof. The pump controller 242 may also be configured to control the stations for different distilled beverages to be delivered from the keg to the beverage dispenser faucets and via one or more dispenser lines. For example, the pump controller 242 may control the first station that is assigned for the gin beverages, the second station that is assigned for the rum beverages, and so on.

The nozzle controller 244 may include one or more instructions, which when executed by the one or more processors direct the one or more injectors that are in fluid communication with the formulations to inject a particular dosage into the dispensing line. The formulations may include, without limitation, THC, purified terpene such as linalool, glycerin, ethanol, polyvinylpyrrolidone, and the like. The one or more nozzles may be used to inject droplets into the dispensing line that supplies the distilled beverages. By controlling the amount of the droplets to be injected and mixed with the distilled beverages, the desired liqueur target may be obtained.

In one embodiment, the nozzle controller 244 may use the chemical signature to control the injection of formulations into the dispenser line of the beverage dispenser. For example, the selected liqueur flavor may include an additional 70% of purified cannabinoid per 1 mg of the distilled beverage (or base flavor). In this example, the chemical signature may include a combination of 0.7 mL of THC, 0.03 mL of purified terpene such as linalool, 0.07 mL of glycerin, 0.2 mL of ethanol, 1 mg of polyvinylpyrrolidone, and 0.1 mL of water to generate an injected formulation that comprises 70% purified cannabinoid by weight and 3% terpene by weight. The 0.1 mL water in this combination may be added in small increments to obtain a viscosity of 1 mPa·s. This combination may be divided into individual doses; for example, a single injection of the combination may provide the 70% purified cannabinoid for the corresponding gram of the distilled beverage.

The printed substrate module 250 may include one or more instructions, which when executed by the one or more processors control the dosage of the printed dissolvable substrate to be combined with the base flavor in the dispensing line to generate the targeted liqueur flavor. In one example, the printed dissolvable substrate may be dissolved by exposing a portion of the substrate in the dispenser line. The printed dissolvable substrate may be inserted and exposed in increments in the dispenser line where each increment may correspond to a subdivided individual dose of the printed dissolvable substrate. The insertion to expose the printed dissolvable substrate to be combined with the base flavor in the dispensing line to generate the targeted liqueur flavor may be done automatically or manually via a knob (not shown) or through a roller (not shown) that inserts the printed dissolvable substrate into the dispenser line. The printed dissolvable substrate may be subdivided using perforated substrates where each section may correspond to a dosage For example, the printed dissolvable substrate may be printed with an ink composition that comprises 70% purified cannabinoid by weight and 3% terpene by weight. This ink composition may be derived by mixing 70 mL of THC, 3.0 mL of purified terpene such as linalool, 7 mL of glycerin, 20 mL of ethanol, 100 mg of polyvinylpyrrolidone, and 15 mL of water. In this example, the printed dissolvable substrate may be subdivided into dosages where each dosage may include 10 mg of THC per individual dosage. Each dosage may be identified through a perforation of the printed substrate. In some instances, each increment in the knob step may be preconfigured to insert a particular dosage into the dispensing line. The exposed or inserted portion, for example, may include 70% of purified cannabinoid per increment.

The datastore 260 may include a repository of identifiers and corresponding combinations of and/or associations between the base flavor, formulations, and/or the compositions of the ink that were printed on the dissolvable substrate. The datastore may further store the configuration of the beverage dispenser and other suitable data pertinent to the operation of the beverage dispenser. In one embodiment, the datastore 260 may utilize a LUT to identify the corresponding chemical signature based upon the detected base flavor and the selected liqueur flavor. The datastore 260 may include a database for different labels of kegs and their corresponding information, previously selected liqueur flavors, and the like. Each prior selected flavor may be associated with an identifier and stored as historical data in the datastore 260. In some embodiments, a machine-learning algorithm may be used on the historical data to statistically determine the combination or combinations that will best generate the desired targeted liqueur flavor.

Example Chemical Signature Engine Server

Figure 3:
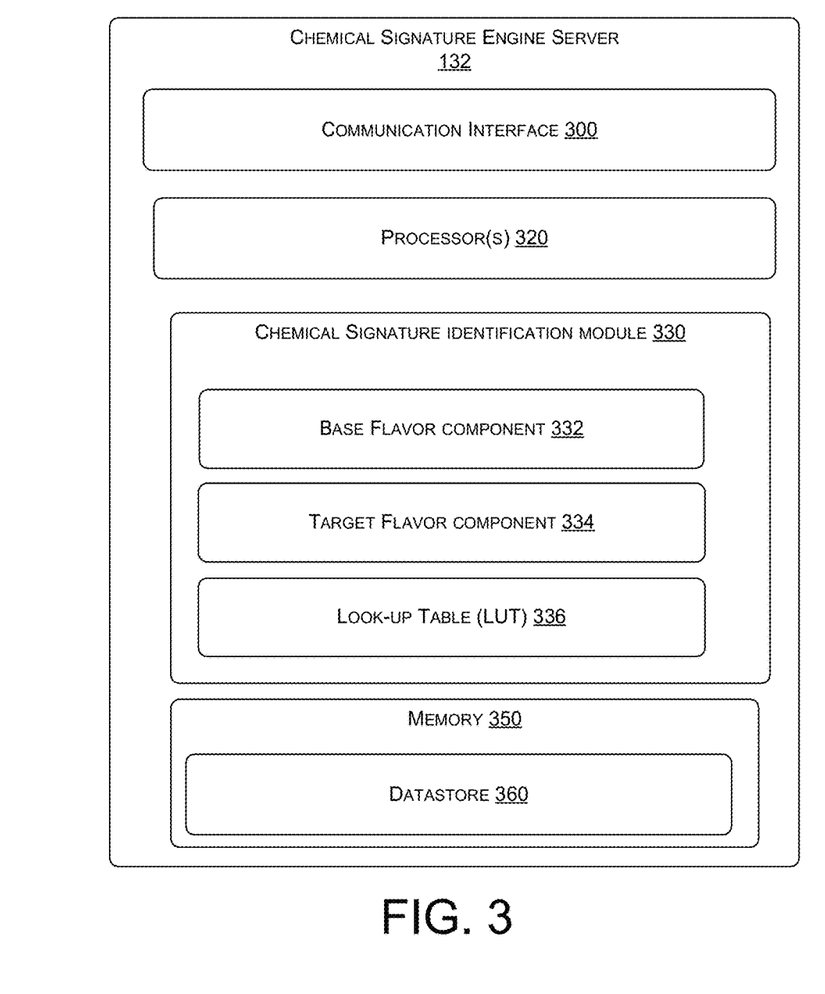
FIG. 3 is a diagram of exemplary components of a chemical signature engine server that supports the on-demand customization of distilled beverages to generate the desired flavor, in accordance with at least one embodiment.

FIG. 3 is a block diagram of various components of an example chemical signature engine server 132 that may support the on-demand customization of the desired flavors that can be pumped from the beverage dispenser. The chemical signature engine server 132 may be configured to perform an analysis of the targeted liqueur flavor and generate the chemical signature that can identify the quantities, components, chemicals, methods, and other data for generating the flavor or flavors to be combined with the base flavor. The chemical signature engine server 132 may include a communication interface 300, one or more processors 320, a chemical signature identification module 330, and a memory 350. The chemical signature identification module 330 may further include a base flavor component 332, target flavor component 334, and a LUT 336, in some examples. The memory 350 also may include a datastore 360.

In one example, the chemical signature engine server 132 may communicate with the beverage dispenser, printer device, user device that is associated with the beverage dispenser, and/or datastore through the communication interface 300. The communication interface 300 may include hardware, software, or a combination of hardware and software that transmits and/or receives data from the user device or beverage dispenser. Communication interface 300 may include a transceiver that facilitates wired or wireless communications through a cellular network or the broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), etc.

Processor(s) 320 may be a central processing unit(s) (CPU), graphics processing unit(s) (GPU), both a CPU and GPU, or any other sort of processing unit(s). Each of the one or more processor(s) 320 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 320 may also be responsible for executing all computer applications stored in the memory, which can be associated with common types of volatile (RAM) and/or non-volatile (ROM) memory. For example, the processor(s) 320 may process the query from the user device, beverage dispenser, or the printer. The query may include information such as, e.g., beverage dispenser information, selected liqueur flavor, base flavor, and the like. In another example, the processor(s) 320 may use the communication interface 300 to send the notifications to network components such as the beverage dispenser, user device, and the printer.

The chemical signature identification module 330 may use one or more components to generate the chemical signature based upon the information in the query that can be received from the user device or the beverage dispenser. The information in the query may include the base flavor that is to be loaded or loaded already in the beverage dispenser, the selected flavor, and the desired source of the additional flavor to be added. The desired source can be via the formulations or the printed dissolvable substrate.

The base flavor component 332 may include a hardware and/or software that can identify the base flavor of the keg to be loaded or that is loaded already in the beverage dispenser. In one example, the base flavor component may use the information in the LUT 336 to identify the base flavor to be associated with the selected liqueur flavor. In this example, base flavor component 332 may parse data information of the received query to identify the one or more of the requesting beverage dispensers, the keg labels and the associated base flavors, and the like. In this example, each keg may be associated with a distinct identification or code included in this data information to determine the type and kind of base flavor that it contains. The base flavor may be associated with distilled beverages that include, without limitation, one or more of gin, tequila, vodka, whiskey, and/or rum.

The target flavor component 334 may be configured to identify the corresponding chemical signature based upon the selected liqueur flavor. In one embodiment, the received query may include the information about the base flavor of the keg that has been loaded into the beverage dispenser. In this embodiment, the target flavor component 334 may use the base flavor information and the selected liqueur flavor to search the corresponding chemical signature in the LUT 336. In some embodiments, the received query may only include the information about the selected liqueur flavor because a user is undecided, for example, on the base flavor to load into the beverage dispenser. In this case, the target flavor component may use the LUT to select different base flavors that are associated with the selected liqueur flavor. In these embodiments, the corresponding chemical signatures may include an additional dosage of purified cannabinoid, terpene, or a suitable combination thereof, that can be combined with a particular and identified base flavor.

The LUT 336 may include information that can be used to identify the corresponding chemical signatures and/or base flavors based upon the selected liqueur flavors. In one embodiment, the LUT may include different chemical signatures for different combinations of the loaded or to be loaded base flavors and selected liqueur flavors. The LUT may also include the labels of the kegs and identification of the beverage dispensers that can be associated with corresponding liqueur flavors and chemical signatures.

Memory 350 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 350 may also include a firewall. In some embodiment, the firewall may be implemented as hardware in the chemical signature engine server 132.

The datastore 260 may include a repository of identifiers and associated chemical signature specifications, base flavors, and any other data pertinent to an operation of the chemical signature engine server 132. The repository may be or include a database, LUT, or other construct that enables any of the components described herein to retrieve data by, for example, sending first data to the datastore 360 and retrieving second data based on the association.

Example Look-up Table (LUT) For Chemical Signatures

Figure 4:
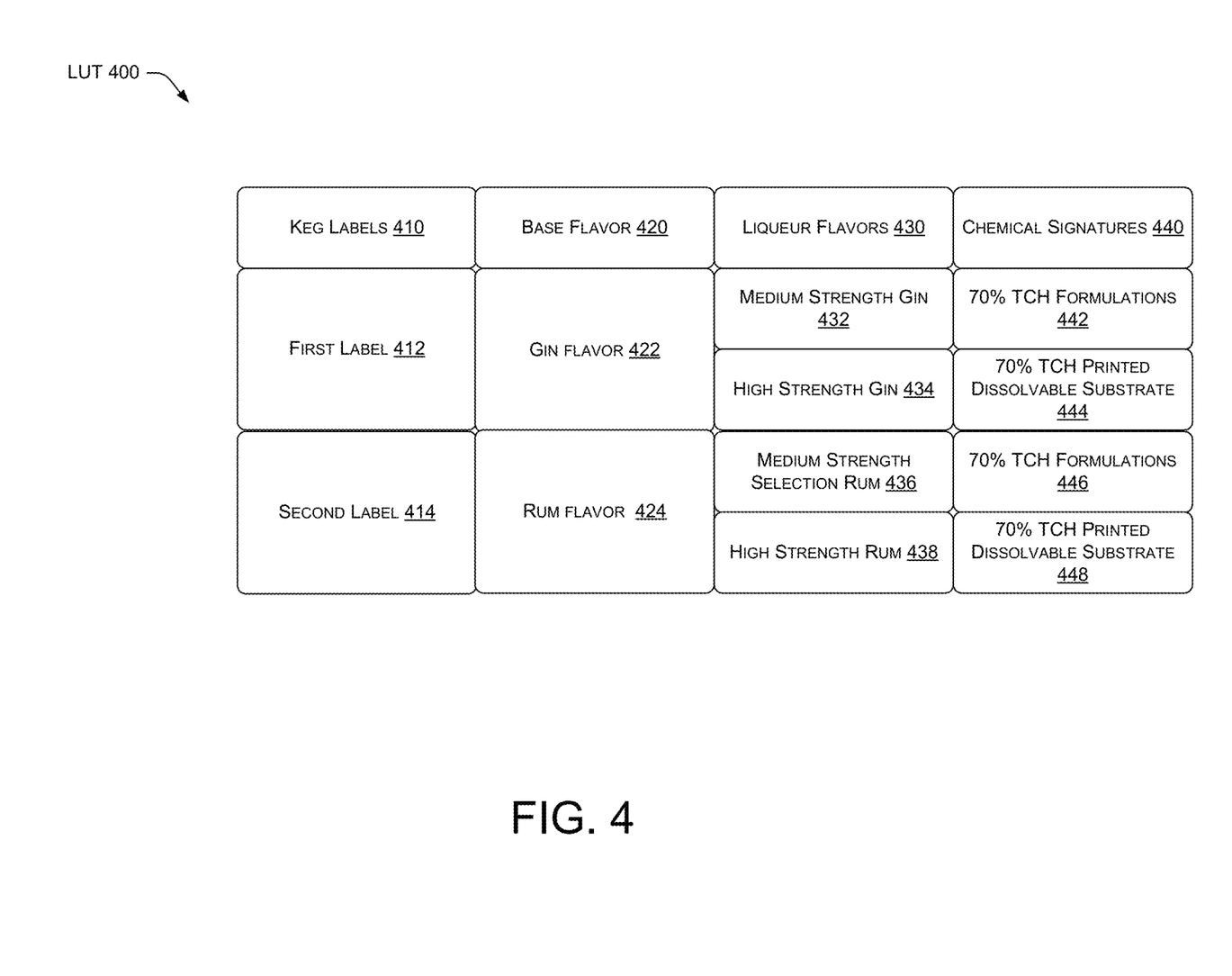
FIG. 4 is an example look-up table (LUT) that can be used as a reference by the beverage dispenser or the chemical signature engine server for generating a chemical signature, in accordance with at least one embodiment.

FIG. 4 illustrates an example block diagram of a LUT 400 that can be used to determine the formulations and/or printed dissolvable substrate to be combined with the base flavor in the dispenser line of the beverage dispenser. For illustration purposes, only two types of distilled beverages were shown; however, additional types such as tequila, vodka, whiskey, or other flavors may be added without affecting the embodiments described herein.

Without limitation, the LUT 400 may include keg labels 410, a corresponding base flavor 420 for each type of keg, different selections for liqueur flavors 430, and corresponding chemical signatures 440 for the selected liqueur flavors. The keg labels 410 may include distinct identifiers for different kegs. The identifier may be stamped, engraved, or affixed to the kegs, for example. The base flavor 420 may include, without limitation, gin, rum, tequila, vodka, whiskey, or other flavors, for example. The liqueur flavors 430 may include a combination of the base flavors and additional chemical components such as the *cannabis*, terpene, and the like. For example, the medium strength gin 432, high strength gin 434, medium strength rum 436, and high strength mint rum may each include additional compounds such as THC, glycerin, ethanol, and the like, that can be added to a particular base flavor. As described herein, gin is a distilled alcoholic drink that may be derived from juniper compounds, coriander compounds, citrus peel compounds, and mixed with a certain volume of ethanol. Rum is a distilled drink that may be derived from fermented sugarcane or molasses, and so on. Each of the selected liqueur flavors may include additional chemical components such as the *cannabis*, terpene, and the like.

For each selected liqueur flavor, the chemical signatures 440 may include corresponding predetermined chemical components such as 70% THC formulations 442, 70% printed dissolvable substrate 444, 70% THC formulations 446, and 70% printed dissolvable substrate 448. The 70% THC formulations 442 may include injecting formulations comprising of 70 mL of THC, 3.0 mL of purified terpene such as linalool, 7 mL of glycerin, 20 mL of ethanol, 100 mg of polyvinylpyrrolidone, and 15 mL of water to each mg of gin. In one embodiment, the 70% THC formulations 442 may be pre-packaged, and each burst of nozzle injection may correspond to a particular dosage of the THC. The 70% printed dissolvable substrate 444 may include the use of 70 mL of THC, 3.0 mL of purified terpene such as linalool, 7 mL of glycerin, 20 mL of ethanol, 100 mg of polyvinylpyrrolidone, and 15 ml of water to create the ink composition that can be used to create the printed dissolvable substrate, and so on. These chemical signatures are for illustration purposes only and different amounts of *cannabis*, terpenes, or a combination thereof, can be added and mixed with the base flavor.

Example Implementation of Generating Targeted Liqueur Flavor

Figure 5:
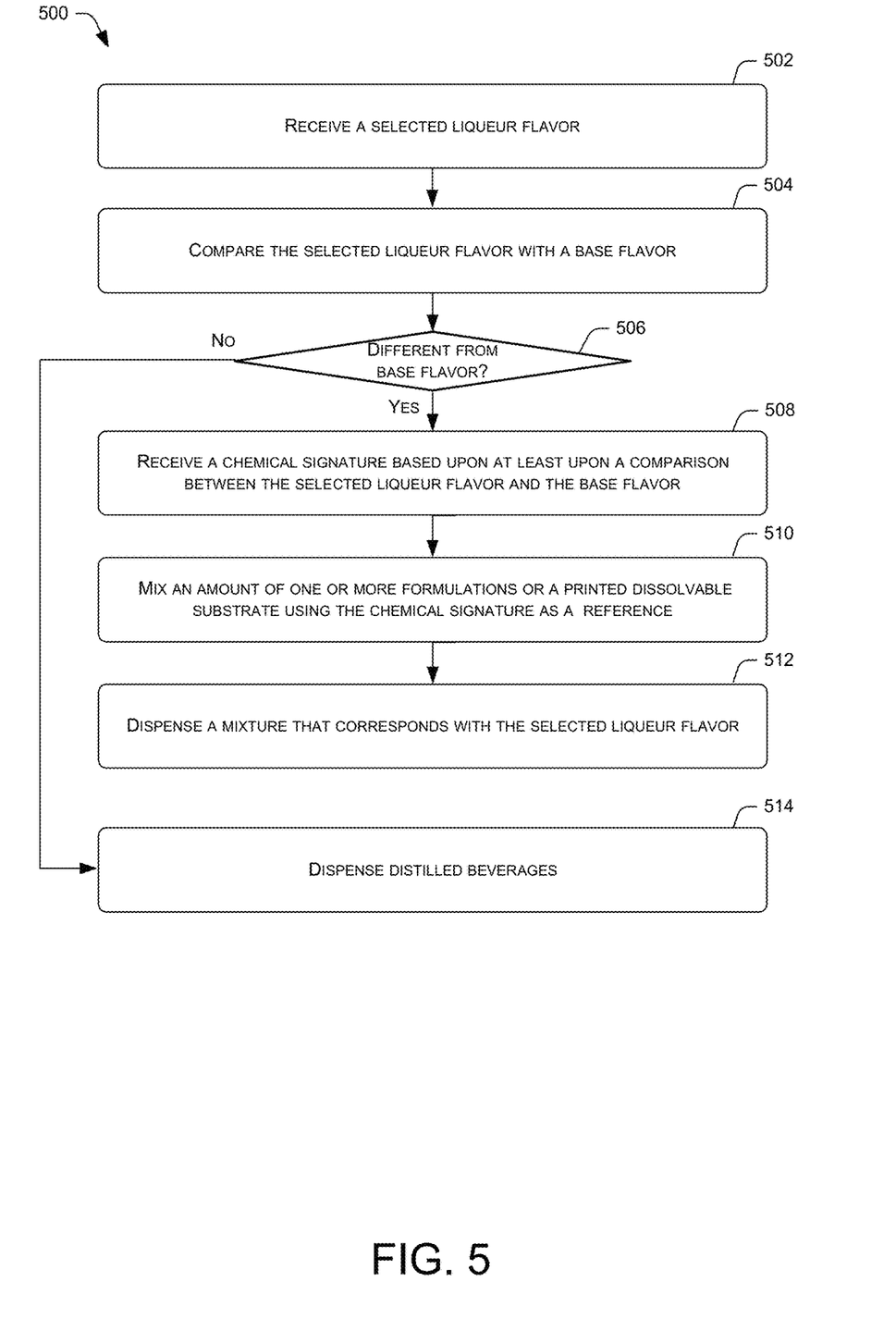
FIG. 5 is a flow diagram of an example methodological implementation for performing the on-demand customization of distilled beverages to generate a selected flavor, in accordance with at least one embodiment.

FIG. 5 presents a process 500 that relates to an on-demand customization of the distilled beverages on the beverage dispenser to generate a selected liqueur flavor. Process 500 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 500 is described with reference to the context diagram 100 of FIG. 1. The process 500 may be performed for beverages other than distilled beverages and using flavoring other than liqueur flavors, but will be described using these as exemplary and not limiting.

At block 502, the beverage dispenser may receive a selected liqueur flavor. In one embodiment, the beverage dispenser may be configured to present a selection of liqueur flavors to a user. For example, a user device that is in communication with the beverage dispenser may display on a user device interface the selection of different liqueur flavors that includes the types of distilled beverages and/or additional formulations. In another example, the beverage dispenser may have a user interface that displays the different selections of liqueur flavors to be selected by a bartender or any other user. In these examples, each liqueur flavor may include a combination of the base flavor that can be derived from the distilled beverages and the additional flavor that can be obtained from the formulations or the printed dissolvable substrate.

At block 504, the beverage dispenser may compare the selected liqueur flavor with a base flavor. The base flavor may be associated with gin, tequila, vodka, whiskey, rum, or other distilled beverages, for example. The selected liqueur flavor may include flavors that are different or separate from the base flavor. In a case where the selected liqueur flavor is different from the base flavor ("Yes" at block 506), then, at block 508, the beverage dispenser may receive a chemical signature based at least in part on the comparison between chemical components of the selected liqueur flavor and the base flavor. The chemical signature may include information to enhance the base flavor, which may include an addition of a particular dosage of purified cannabinoid, terpene, or a suitable combination thereof.

At block 510, the beverage dispenser may mix an amount of one or more formulations or printed dissolvable substrate into a dispenser line of the beverage dispenser. The dispenser line in the beverage dispenser may include a pressurized tube that connects the keg of the distilled beverages and the beverage dispenser tap or faucet. In one embodiment, the amounts of formulations or printed solvable substrate to be injected or mixed into the dispenser line is based upon the weight of the distilled beverage to be pumped at the beverage dispenser tap. For example, an ounce of beer weighs about 28,350 mg. In this example, a similar volume of formulations gathered from a mixture of 70 mL of THC, 3.0 mL of purified terpene such as linalool, 7 mL of glycerin, 20 mL of ethanol, 100 mg of polyvinylpyrrolidone, and 15 ml of water may be injected into the dispenser line to obtain, for example, the 70% THC formulations as described above.

In some embodiments, the printed dissolvable substrate may be obtained from the ink composition that comprises the combined formulations to generate the particular dosage of purified cannabinoid and terpene. In this embodiment, and following the preceding example, the 0.7 mL of THC, 0.03 mL of purified terpene such as linalool, 0.07 mL of glycerin, 0.2 mL of ethanol, 1 mg of polyvinylpyrrolidone and 0.1 mL of water are well mixed such that all the compounds can be homogeneously dispersed to form the ink composition. The ink composition is then loaded into an ink cartridge and printed on the dissolvable substrate, which can be used as an alternative to the injection of the one or more formulations as described above.

At block 512, the beverage dispenser may dispense a mixture that corresponds with the selected liqueur flavor.

Returning to block 506, in a case where the selected liqueur flavor is the same as the base flavor, then, at block 512, the beverage dispenser may dispense the selected distilled beverages without the additional enhancement or customization as described herein.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
an interface to receive a target flavor;
a processor coupled to the interface, the processor configured to execute instructions to:
    compare the target flavor with a base flavor; and
    receive a chemical signature based at least in part a upon the comparison between the target flavor and the base flavor;
a dispenser station module coupled to the processor, the dispenser station module further comprising;
    a pump controller that controls an amount of a beverage to be supplied via a dispenser line, wherein the beverage is associated with the base flavor; and
    a nozzle controller that uses the chemical signature as a reference for injecting one or more formulations into the dispenser line, wherein a mixing of the beverage and the one or more formulations generates a combination that is associated with the target flavor.
2. The apparatus claim 1, wherein the beverage includes at least a distilled beverage.
3. Apparatus of claim 1, wherein the processor executes instructions to send a query to a server that includes data information of a comparison between chemical components of the target flavor and the base flavor.

4. The apparatus of claim 3, wherein the processor receives the chemical signature in response to the query sent to the server.

5. The apparatus of claim 1, further comprising a look-up table (LUT) that includes corresponding chemical signatures for different target flavors.

6. The apparatus claim 1 further comprising:
a printed substrate module that provides a dosage of a printed dissolvable substrate into the dispenser line, wherein the dosage of the printed dissolvable substrate is combined with the base flavor to generate the target flavor.

7. The apparatus of claim 6, wherein the printed dissolvable substrate is used as an alternative to the one or more formulations.

8. The apparatus of claim 1, wherein the formulations include at least one of a Tetrahydrocannabinol (THC), a purified terpene, glycerin, ethanol, polyvinylpyrrolidone, or water.

9. The apparatus of claim 1, wherein the target flavor is associated with the beverage that is combined with a *cannabis* that includes a mixture of Tetrahydrocannabinol (THC), purified terpene, glycerin, ethanol, polyvinylpyrrolidone, and water.

10. A method comprising:
receiving, by a beverage dispenser, a target flavor;
comparing, at the beverage dispenser, the target flavor with a base flavor that is associated with a beverage;
receiving a chemical signature based at least in part upon the comparison between the target flavor and the base flavor; and
using the chemical signature as a reference for injecting one or more formulations into a dispenser line, wherein a mixing of the one or more formulations and the base flavor generates a combination that is associated with the target flavor.

11. The method of claim 10 further comprising: sending a query to a server based upon a comparison between chemical components of the target flavor and the base flavor.

12. The method of claim 10 further comprising: sending a query to a server that includes data information of a comparison between chemical components of the target flavor and the base flavor.

13. The method of claim 12, wherein the receiving of the chemical signature is in response to the sending of the query to the server.

14. The method of claim 12, wherein a difference between the chemical components of the target flavor and the base flavor corresponds to the injected one or more formulations in the dispenser line.

15. The method of claim 10 further comprising:
inserting into the dispenser line a dosage of a printed dissolvable substrate, wherein the dosage of the printed dissolvable substrate is combined with the base flavor to generate the target flavor.

16. The method of claim 10, wherein the formulations include at least one of a Tetrahydrocannabinol (THC), a purified terpene, glycerin, ethanol, polyvinylpyrrolidone, or water.

17. The method of claim 10, wherein the beverage includes at least a distilled beverage.

18. One or more non-transitory computer-readable storage media storing computer-executable instructions that upon execution cause one or more computers to collectively perform acts comprising:
receiving, by a beverage dispenser, a target flavor;
comparing, by the beverage dispenser, the target flavor with a base flavor that is associated with a beverage;
receiving a chemical signature based at least in part upon a comparison between chemical components of the target flavor and the base flavor; and
using the chemical signature as a reference for injecting one or more formulations into a dispenser line, wherein a mixing of the one or more formulations and the base flavor generates a combination that is associated with the target flavor.

19. The one or more non-transitory computer-readable storage media of claim 18, wherein the beverage includes at least a distilled beverage.

20. The one or more non-transitory computer-readable storage media of claim 18, wherein the formulations include at least one of a Tetrahydrocannabinol (THC), a purified terpene, glycerin, ethanol, polyvinylpyrrolidone, or water.

* * * * *